(12) United States Patent
Shimada et al.

(10) Patent No.: US 8,305,862 B2
(45) Date of Patent: Nov. 6, 2012

(54) OPTICAL INFORMATION RECORDING AND REPRODUCING DEVICE

(75) Inventors: Kenichi Shimada, Yokohama (JP); Tatsuro Ide, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 649 days.

(21) Appl. No.: 12/116,245

(22) Filed: May 7, 2008

(65) Prior Publication Data

US 2009/0080313 A1 Mar. 26, 2009

(30) Foreign Application Priority Data

Sep. 25, 2007 (JP) ................................. 2007-246476

(51) Int. Cl.
*G11B 7/00* (2006.01)
(52) U.S. Cl. .................. 369/103; 369/44.23; 369/44.24; 369/112.1
(58) Field of Classification Search .................. 369/103, 369/100, 112.03, 112.1, 112.3, 44.23, 44.24, 369/44.27
See application file for complete search history.

(56) References Cited

U.S. PATENT DOCUMENTS

| | | | | |
|---|---|---|---|---|
| 7,239,594 B2 * | 7/2007 | Edwards | ........................ | 369/103 |
| 7,800,988 B2 * | 9/2010 | Weirauch | ................... | 369/44.27 |
| 7,839,750 B2 * | 11/2010 | Horinouchi et al. | .......... | 369/103 |
| 2006/0280096 A1 * | 12/2006 | Riley et al. | ..................... | 369/103 |
| 2008/0037397 A1 * | 2/2008 | Waldman et al. | ............. | 369/103 |
| 2008/0068973 A1 * | 3/2008 | Ikeda | ........................ | 369/112.03 |
| 2008/0198722 A1 * | 8/2008 | Weirauch | ....................... | 369/100 |
| 2008/0219128 A1 * | 9/2008 | Ide et al. | ........................ | 369/103 |

FOREIGN PATENT DOCUMENTS

| | | |
|---|---|---|
| EP | 1 708 180 | 10/2006 |
| EP | 1 881 494 | 1/2008 |
| JP | 11-133843 | 5/1999 |
| JP | 11-311938 | 11/1999 |
| JP | 2003-178462 | 6/2003 |
| JP | 2004-272268 | 9/2004 |
| JP | 2006-164480 | 6/2006 |
| WO | WO 2004/102542 A1 | 11/2004 |
| WO | WO 2005/059902 | 6/2005 |

OTHER PUBLICATIONS his-Fu Shih, "Integrated optical unit design for the collinear holographic storage system", IEEE, Feb. 2007, pp. 948-950.*
Ian Redmond, "The InPhase Professional Archive Drive OMA; Design and Function", Optical Data Storage Topical Meeting IEEE, 2006.

* cited by examiner

*Primary Examiner* — Thuy Pardo
(74) *Attorney, Agent, or Firm* — Antonelli, Terry, Stout & Kraus, LLP.

(57) ABSTRACT

The optical information recording and reproducing device utilizing holography requires the optical system to generate the signal beam and the reference beam to be irradiated to the holographic storage medium as well as another optical system to generate the curing light beam to be irradiated to the holographic storage medium. Furthermore, from the viewpoint of backward compatibility, if the same device is used for recording or reproduction on the conventional optical discs represented by Blu-ray Disc, another optical system adaptable to recording and reproduction on these optical disks is required. This means the optical system configurations become complicated and larger in size. One solution for downsizing is to use the reference beam also as the curing light beam. Another way is sharing of optical path for curing light beam and for the reference beam. Furthermore, it is possible to share the light source for generating the curing light beam and for generating the recording or reproducing light beam. In such way, optical system configurations become simple.

8 Claims, 10 Drawing Sheets

(a)

(b)

OPTICAL INFORMATION RECORDING AND REPRODUCING DEVICE

BACKGROUND

This invention relates to devices of recording and/or reproducing information on holographic storage medium.

It is desired that in the near future, optical disks will be enlarged in capacity to a level of 100 GB to 1 TB, that is, to the same level as a HDD (Hard Disk Drive).

However, in order to realize such a large capacity optical disk, it will be necessary to develop a new storage technology different from the past trend of high-density technology as indicated by the use of shorter wavelength and higher NA objective lenses.

Holographic recording is a promising technology for future optical data storage with larger capacity and higher transfer rate.

In the holographic technology, data information is recorded through interference patterns of signal beam modulated two-dimensionally by a spatial light modulator and reference beam in holographic storage medium.
And data information is reproduced two-dimensionally by means of CMOS, CCD, and other photo detectors These features are effective for large-capacity, high-speed recording and reproduction of information.

The hologram recording technology is referred to, for example, in Japanese Patent Application Laid-open Publication No. 2004-272268-A (Patent Document 1) and Non-Patent Document 1. These documents carry descriptions about the so-called angular multiplexing recording method. Furthermore, the same Patent Document 1 also describes a technology that can make array distances between adjoining holograms narrower by placing a spatial filter (polytopic filter) at the beam waist of the signal beam and can increase recording density and capacity as compared with the conventional angular multiplexing recording method.

The hologram recording technology is also taken up, for example, in WO 2004-102542 (Patent Document 2). This Patent Document 2 describes an example about shift multiplexing method. In this method, hologram is recorded by interference of signal beam from the inner pixels in a spatial light modulator and reference beam from the outer pixels in the ring-belt shape zone in the same modulator.

Another related art is also found in Japanese Patent Application Laid-open Publication No. 11-311938-A (Patent document 3). This Patent Document 3 discloses an example about cure system to cure a recorded hologram.

[Patent Document 1] Japanese Patent Application Laid-open Publication No. 2004-272268-A
[Patent Document 2] WO 2004-102542
[Patent Document 3] Japanese Patent Application Laid-open Publication No. 11-311938-A
[Non-patent Document 1] "The InPhase Professional Archive Drive OMA; Design and Function," Ian Redmond; Optical Data Storage Topical Meeting 2006.

SUMMARY

Incidentally, as described in "The InPhase Professional Archive Drive OMA; Design and Function," Ian Redmond; Optical Data Storage Topical Meeting 2006, (Non-patent Document 1), it becomes necessary to separately prepare an optical system to create light beam for cure, namely, for pre-cure and post-cure, and irradiate the recording medium, in addition to the optical system to generate the signal beam and the reference beam to irradiate the recording medium.

The Patent Document 3 combines the above two optical systems together into one optical system. However, this configuration has a problem in performing uniform cure treatment, because the cure beam is irradiated with a convergent beam and, therefore, is difficult to be distributed evenly in light intensity in its irradiating ambits in the recording medium, thus causing a mixture of insufficiently cured ambit and overly cured ambit.

Furthermore, if we desire to record and reproduce the conventional optical disks as represented by Blu-ray Disc on the same device, it is necessary to add an optical system adaptable to recording and reproduction on these conventional optical discs from the viewpoint of backward compatibility.

For the purpose of downsizing drive system, it is desirable that optical system should be made as sharable as possible, but the technology on the optical system configuration to satisfy the above-mentioned requirement have not been disclosed at all in the past.

The present invention has been made in view of the foregoing problems, with the aim of achieving simplification of drive system.

The aim of the present invention can be attained, for example, by sharing the same optical path for both of the reference light beam and the curing light beam.

According to the present invention, we can downsize the optical information recording and reproducing device utilizing holography, and achieve backward compatibility.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Explanation is made below of the examples of the present invention.

Figure 1:
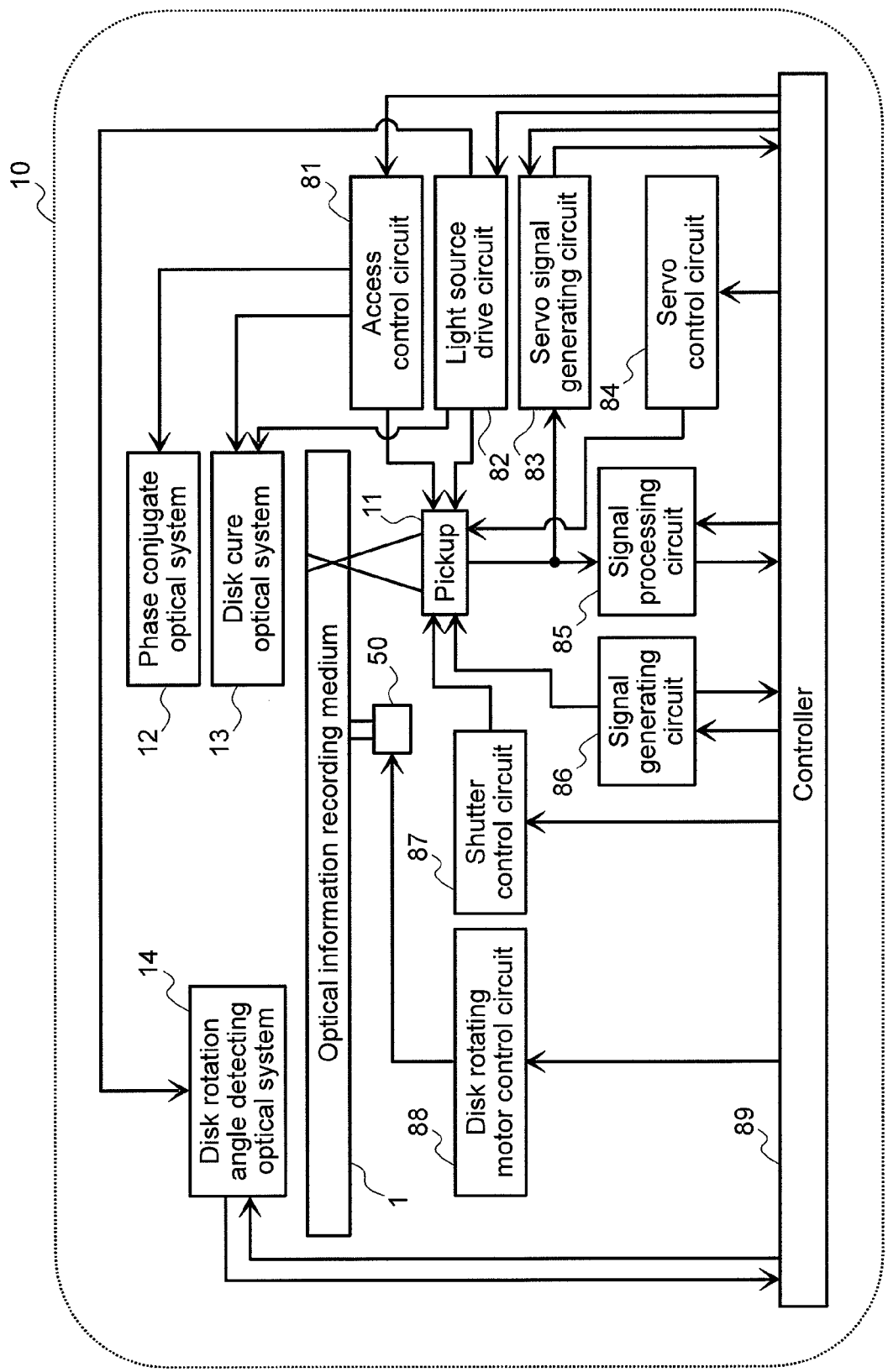
FIG. 1 is a block diagram showing an example of optical information recording and reproducing device.

FIG. 1 shows the overall configuration of an optical information recording and reproducing device which utilizes holography to record and/or reproduce digital information.

The optical information recording and reproducing device 10 includes the pickup 11, the phase conjugate optical system 12, the disk cure optical system 13, the disk rotating angle detecting optical system 14, and the rotating motor 50. The optical information recording medium 1 is configured rotatable by the rotating motor 50.

The pickup 11 has the functions to output the reference light and the signal light to the optical information recording medium 1 so as to record digital information by utilizing the holography.

In this case, the information signal to be recorded is sent out from the controller 89 and via the signal generating circuit 86 to the spatial light modulator (to be described later) located within the pickup 11, where the signal light is modulated.

In order to reproduce the information stored in the light information recording medium 1, the phase conjugate light of the reference light outputted from the pickup 11 is to be generated by the phase conjugate optical system 12. The phase conjugate light referred to above is the light wave that has the same wave surface as the input light but moves toward the opposite direction. The reconstruction light reconstructed by the above phase conjugate light is to be detected by the light detector (to be described later) located within the pickup 11 and reconstructed by the signal treating circuit 85.

The irradiation time during which the reference light and the signal light are irradiated to the optical information recording medium 1 is adjustable by controlling the opening-closing cycle of the shutter (to be described later) within the pickup 11, by means of the controller 89 via the shutter control circuit 87.

The disk cure optical system 13 plays the role of creating a light beam used for precure and post-cure of the optical information recording medium 1. What is called "precure" here is the preliminary process wherein, when recording of certain optical information is to be made in a desired position within the optical information recording medium 1, a predetermined light beam is irradiated to that desired position before irradiation of the reference light and the signal light to that desired position. Likewise, "post-cure" means the post-process wherein, after recording of certain optical information has been made in a desired position within the optical information recording medium 1, a predetermined light beam is irradiated to that desired position to make it write prohibit.

The disk rotation angle detecting optical system 14 is used to find out the rotation angle of the optical information recording medium 1. When to adjust the optical information recording medium 1 to a predetermined rotation angle, the disk rotation angle detecting optical system 14 functions to detect the signal corresponding to the rotation angle, and the detected signal is used to operate the controller 89 and, via the disk rotating motor control circuit 88, to be able to control the rotation angle of the optical information recording medium 1.

From the light source drive circuit 82, predetermined light source drive current is supplied to the light sources in the pickup 11, the disk cure optical system 13, and the disk rotation angle detecting optical system 14, thus enabling each light source to emit light with predetermined light intensity.

Also, the pickup 11, the phase conjugate optical system 12, or the disk cure optical system 13 has a mechanism to make each position slidable in the radius direction of the optical information recording medium 1 with position control undertaken by the access control circuit 81.

By the way, because the recording technology based on the holography is a technology that can record ultra-high-density information, allowable margin of error in regard to gradient and shift of the optical information recording medium 1, for example, is inclined to become extremely small. Therefore, it may well be practiced firstly to provide, in the pickup 11, some mechanism to detect amount of shift derived from causes of shift for which allowable margin of error is small, such as gradient and displacement of the optical information recording medium 1, secondly to generate servo control signal in the servo signal generating circuit 83, and thirdly to provide a servo mechanism in the optical information recording and reproducing device 10 so as to correct such amount of shift through the servo control circuit 84.

From the viewpoint of downsizing of the optical information recording and reproducing device 10, it may well be exercised to do simplifying by grouping some or all of the optical systems in regard to the pickup 11, the phase conjugate optical system 12, the disk cure optical system 13, and the disk rotation angle detecting optical system 14.

Figure 2:
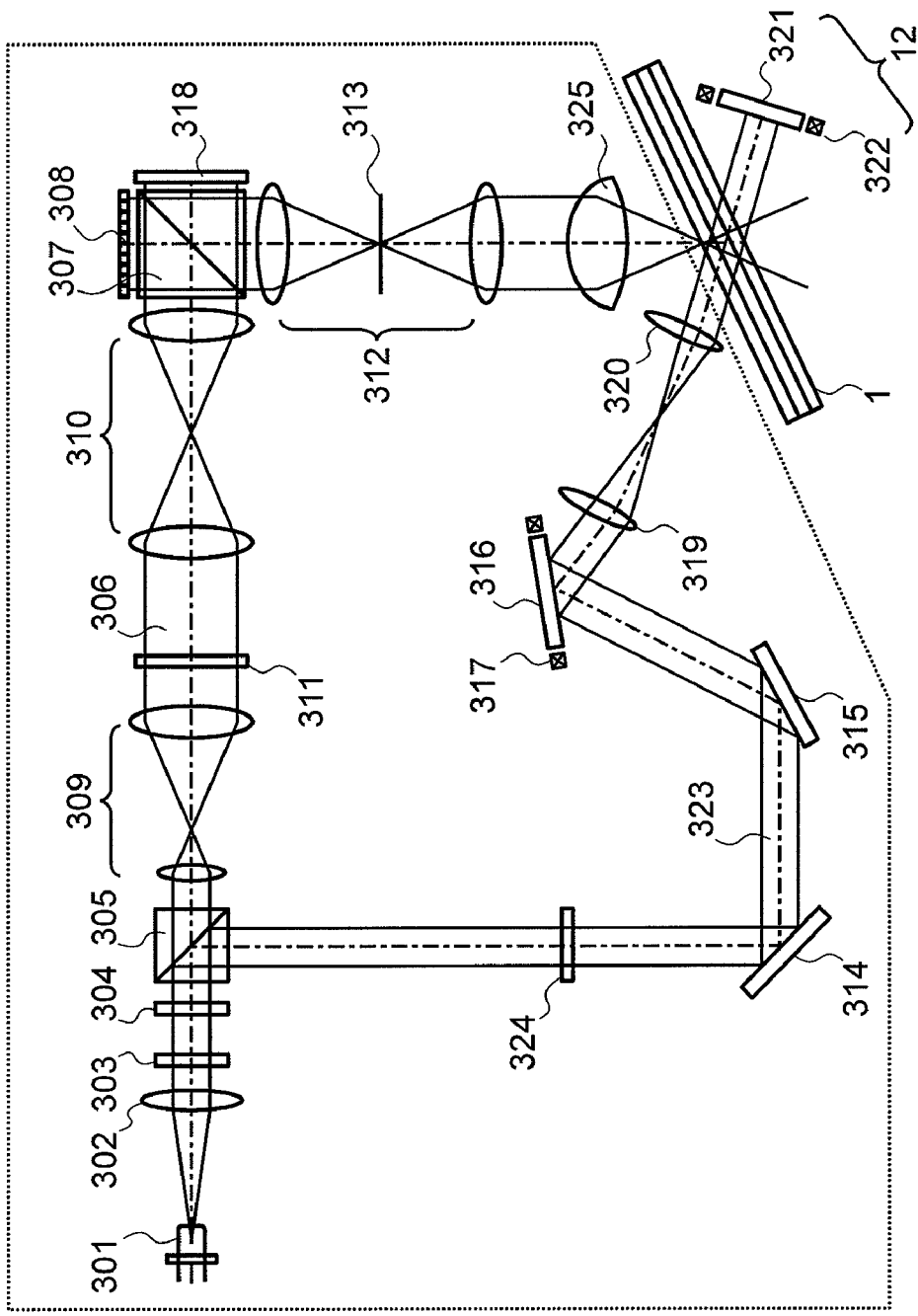
FIG. 2 is a schematic diagram illustrating an example of pickup of an optical information recording and reproducing device.

An example of the optical system configuration in case the pickup 11 and the disk cure optical system 13 are grouped into one is shown in FIG. 2.

In FIG. 2, the light beam outputted from the light source 301 is transmitted through the collimator lens 302 and is incident on the shutter 303. When the shutter 303 is open, the light beam after transmitted through the shutter 303 is to be regulated as to the polarization direction by the optical element 304 composed of, for example, a ½ wavelength plate, etc., so that ratio of P-polarized to S-polarization by light volume may become as desired, and then, to be incident on the PBS (polarization beam splitter) prism 305.

The light beam transmitted through the PBS prism 305 is expanded in light beam diameter by the beam expander 309. After that and through the phase mask 311, the relay lens 310, and the PBS prism 307, the light beam is to be incident on the spatial light modulator 308.

The signal light beam with the information added by the spatial light modulator 308 is transmitted through the PBS prism 307, and propagated through the relay lens 312 and the spatial filter 313. The signal light beam is then collected at the optical information recording medium 1 by means of the objective lens 325.

On the other hand, the light beam reflected by the PBS prism 305 is to function as the reference light beam, to be set as to its polarization direction depending on whether for recording or for reproduction by the polarization direction transformation unit 324, and then to be incident on the mirrors 314 and 315 through the galvano-mirror 316. Since the angle of the galvano-mirror 316 is adjustable by the actuator 317, the reference light beam which is to incident on the information recording medium 1 after transmitted through the lenses 319 and 320 can be set as desired in respect of its incident angle.

By making the signal light beam and the reference light beam are thus made to be incident on the optical information recording medium 1 in such manner that each light beam overlap the other, patterns of interference fringes are formed inside the recording medium, and recording of the information is finished by writing these patterns in the recording medium. Further, recording in multiple angles is possible, since angle of incidence of the reference light beam to be incident on the optical information recording medium 1 can be varied by means of the galvano-mirror 316.

In the case of reproducing recorded information, the reference light beam is made to be incident on the optical information recording medium 1, and when the light beam having been transmitted through the optical information recording medium 1 is reflected by the galvano-mirror 321, its phase conjugate light is to be created.

The reconstruction light beam reconstructed by the above phase conjugate light is to be propagated through the objective lens 325, the relay lens 312, and the spatial filter 313. After that, the reconstruction light beam is reflected by the PBS prism 307 before being incident on the light detector 318 for reproduction of the recorded signal.

In order to perform precure and post-cure of the optical information recording medium 1, the reference light beam is to be used as the curing light beam and irradiated in a state of parallel beam to the optical information recording medium 1 for curing, realizing common use of the light path. In this manner, the curing light beam can be made even in terms of light intensity in the irradiation ambits, bringing about advantage in making the curing treatment uniform without leaving mixture of insufficiently cured portions and overly cured portions.

Also, the light beam for cure treatment traces the light path, which the above reference light beam has just followed, for at least a part of that light path from the above splitter to the recording medium, and attains the aim of applying the cure treatment to the recording medium, thereby realizing downsizing of the device.

Generally speaking, the signal light beam and the reference light beam are required to be light beams of high coherence such as tunable laser beams from the holographic viewpoint, but from the viewpoint of signal quality, the curing light beam is required to be a light beam of low coherence so as not to form futile holograms causative of noises.

Figure 3:
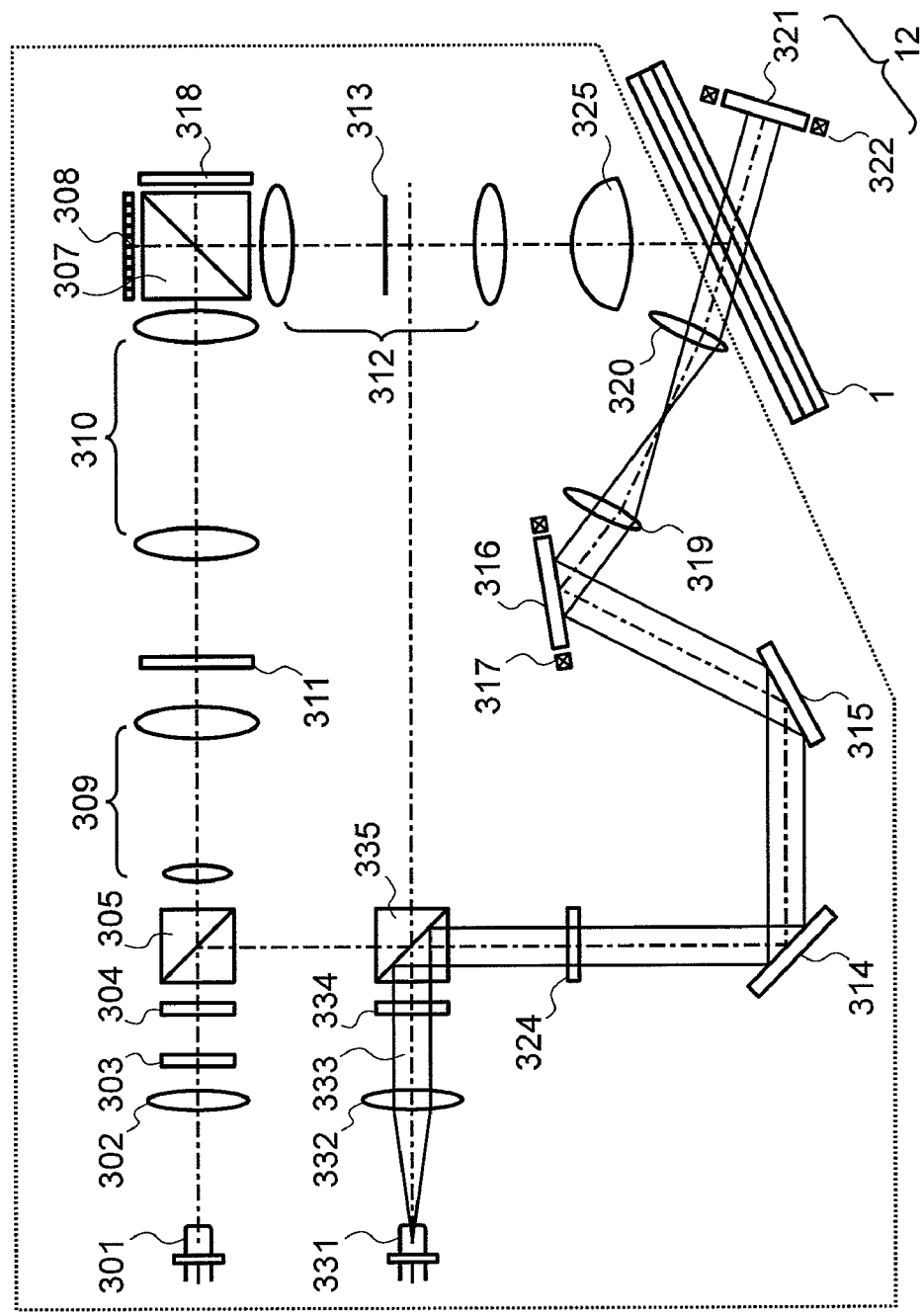
FIG. 3 is a schematic diagram illustrating an example of pickup of an optical information recording and reproducing device.

To satisfy the above requirements, it may well be exercised, as shown in FIG. 3, for example, to provide the laser light source 331 which can output a light beam of lower coherence than the laser light source 301. As FIG. 3 shows, the curing light beam 333 is outputted from the laser light source 331, goes through the collimator lens 332 and the diffuser plate 334, and reaches the PBS prism 335 where the curing light beam is combined with the light path of the reference light beam by the PBS prism 335 to be finally irradiated to the optical information recording medium 1.

Although each light beam is required to have different characteristic in point of coherence as explained above, the provisions of two laser light sources, such as the high-coherent laser light source 301 and the low-coherent laser light source 331, can realize an optical system configuration satisfying the requirements regarding coherence, while sharing is made of the optical system. Most of the light path is shared by the curing light beam and the reference light beam, offering advantage in achieving downsizing of the device.

Further, by developing the optical system configuration shown in FIG. 3, the present invention is capable to record or reproduce information in the optical disks of BDs or HD-DVDs. Further explanation is given below with reference to FIG. 8.

When the holography is utilized for recording or reproducing signals, explanation has been made in the present example and referring to FIG. 3; that is, the light beam outputted from the laser light source 301 which produces a light beam of high coherence is used for the signal light beam as well as the reference light beam, while the light beam outputted from the laser light source 331 which produces a light beam of lower coherence than the laser light source 301 is used for the curing light beam.

When recording or reproduction of information is made on the optical disk 101 such as BD and HD-DVD in the present example, the light beam outputted from the laser light source 331 is used since the low-coherent light beam has to be used to suppress laser noises. In other words, the present example is characterized in that the light source producing light beam is shared between the curing light beam and the light beam for recording or reproduction of BDs and HD-DVDs. The driver circuit for the laser light source 331 may well be connected with a high frequency superposed circuit so as to produce a laser light of low coherence.

Which the light beam outputted from the laser light source 331 is irradiated to, the optical information recording medium 1 as the light beam for curing or to the optical disk 101 as the light beam for recording or reproduction on BDs or HD-DVDs, is to be chosen by controlling the light volume irradiated according to the combination of the polarization direction transformation unit 334 and the PBS prism 335. The polarization direction transformation unit 334 can achieve its purpose by insertion or withdrawal of a liquid crystal element and a wavelength plate.

In case information is recorded or reproduced on the optical disks 101 such as BDs and HD-DVDs, the polarization direction is to be controlled so that the light beam exiting from the polarization direction transformation unit 334 may have P-polarization. This enables the light beam to be incident on the PBS prism 335 and the PBS prism 404 to be transmitted through and to be led to the light path of the beam expander 405.

The light beam transmitted through the beam expander 405 proceeds, via the starting mirror 406 and the ¼ wavelength plate 407, to be incident on the objective lens 408 in a state of circularly polarized light and is to be collected on the information recording plane of the optical disk 101. The light beam reflected on the optical disk 101 takes the light path it has come reversely, and is transmitted through the objective lens 408, the ¼ wavelength plate 407, the starting mirror 406, and the beam expander 405, and is reflected at the beam splitter 404. The light beam after reflected at the beam splitter 404 is transmitted through the collimator lens 409, and a required light beam is diffraction-split by the diffraction grating 410 on the detection side and collected at the photodetector 411 so as to be able to detect required servo signals.

In the case of curing the optical information recording medium 1, the light beam exiting from the polarization direction transformation unit 334 is so controlled in polarization direction as to become S-polarized light; thus the light beam is to be reflected upon being incident on the PBS prism 335 and is able to be led to the light path of the reference light beam. By utilizing the light path for the reference light beam, the light beam from the laser light source 331 is led to the optical information recording medium 1 to carry out precuring and post-curing of the recording medium 1.

As described above, the same light source is shared for generating the light beams for curing and for recording or reproducing on BDs or HD-DVDs. Moreover, sharing of a large portion of the light path is also made for the curing light beam and the reference light beam. Such sharing in the light source and the light path makes it possible to wrap up a plurality of optical system configurations rationally in one cabinet, offering a great advantage in downsizing of the device.

Besides, the same rotary motor may well be used in the present invention for the optical information recording medium 1 as well as the optical disk 101 such as BDs or HD-DVDs. Or otherwise, separate rotary motors may well be provided for individual uses and driven by the disk rotating motor control circuit.

Also, the optical information recording medium 1 in the present invention may well take the shape of a card.

Figure 4:
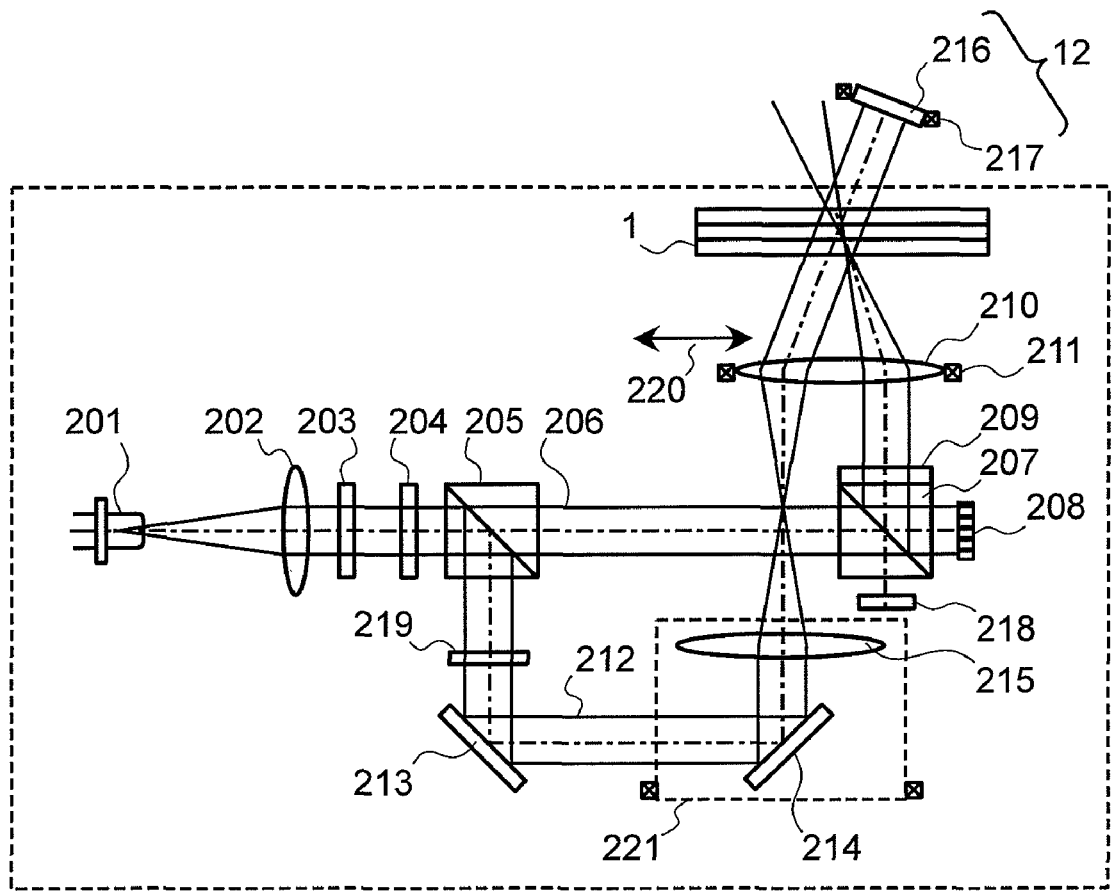
FIG. 4 is a schematic diagram illustrating an example of pickup of an optical information recording and reproducing device.

The optical system configuration is not limited to what are shown in FIG. 2 and FIG. 3, but may well be set up as shown in FIG. 4. Now, explanation is given hereinbelow in reference to FIG. 4.

The light beam outputted from the light source 201 is transmitted through the collimator lens 202 to be incident on the shutter 203. When the shutter 203 is open, the light beam after passing through the shutter 203 is to receive control on polarization direction by the optical element 204 composed of a ½ wavelength plate, for example, and others so that the ratio of P-polarized light and S-polarized light in terms of light volume may become as required. The light beam is then incident on the PBS prism 205.

The light beam transmitted through the PBS prism 205 proceeds through the PBS prism 207 to be incident on the spatial light modulator 208.

The signal light beam 206 with information added by the spatial light modulator is reflected at the PBS prism 207 and propagated through the angle filter 209 which admits only the light beam having a certain predetermined angle of incidence. After that, the signal light beam collects on the optical information recording medium 1.

On the other hand, the light beam reflected at the PBS prism 205 functions as the reference light beam 212 and is set up by the polarization direction transformation unit 219 so as to have a predetermined polarization direction depending on whether for recording or for reproduction. The polarized light beam then advances via the mirrors 213 and 214 before being incident on the lens 215.

The lens 215 performs the role of collecting the reference light beam 212 on the back focus plane of the objective lens 210, and the reference light beam that has once focused on the back focus plane of the objective lens 210 is again turned into a nearly parallel light beam by the objective lens 210, in which form it is to be incident on the optical information recording medium 1.

The objective lens 210 or the optical block 221 is movable, for example, in the direction indicated by the arrow mark 220. By sliding the position of the objective lens 210 or the optical block 221 along the movable direction 220, the relative positions of the objective lens 210 and the focus point in the back focus plane of the objective lens 210 changes, thereby allowing the angle of incidence to be set at a desired angle when the reference light beam is to be incident on the optical information recording medium 1.

By making the signal light beam and the reference light beam enter the optical information recording medium 1 together overlapping each other, interference fringe patterns are to be formed. Writing these patterns in the recording medium completes recording of information. Also, by sliding the position of the objective lens 210 or the optical block 221 along the movable direction 220, the angle of incidence at which the reference light beam is to be incident on the optical information recording medium can be changed, and this enables multi-angle recording.

In case of reproducing recorded information, as above-mentioned, the reference light beam is made to be incident on the optical information recording medium 1, and the light beam which is transmitted through the optical information recording medium 1 is to be reflected by the galvano mirror 216, thereby producing its phase conjugate light.

The reconstruction light beam reconstructed by the phase conjugate light is propagated through the objective lens 210 and the angle filter 209. After that, the reconstruction light beam is transmitted through the PBS prism 207, is incident on the light detector and is able to reproduce recorded signals.

Since the optical system shown in FIG. 4 is of the configuration in which both the signal light beam and the reference light beam are made to enter the same objective lens, it has a merit in that it can be downsized drastically as compared with the optical system configurations shown in FIG. 2 and FIG. 3.

When to conduct precure and post-cure of the optical information recording medium 1 in the above regard, the reference light beam is used as the light beam for curing.

Figure 5:
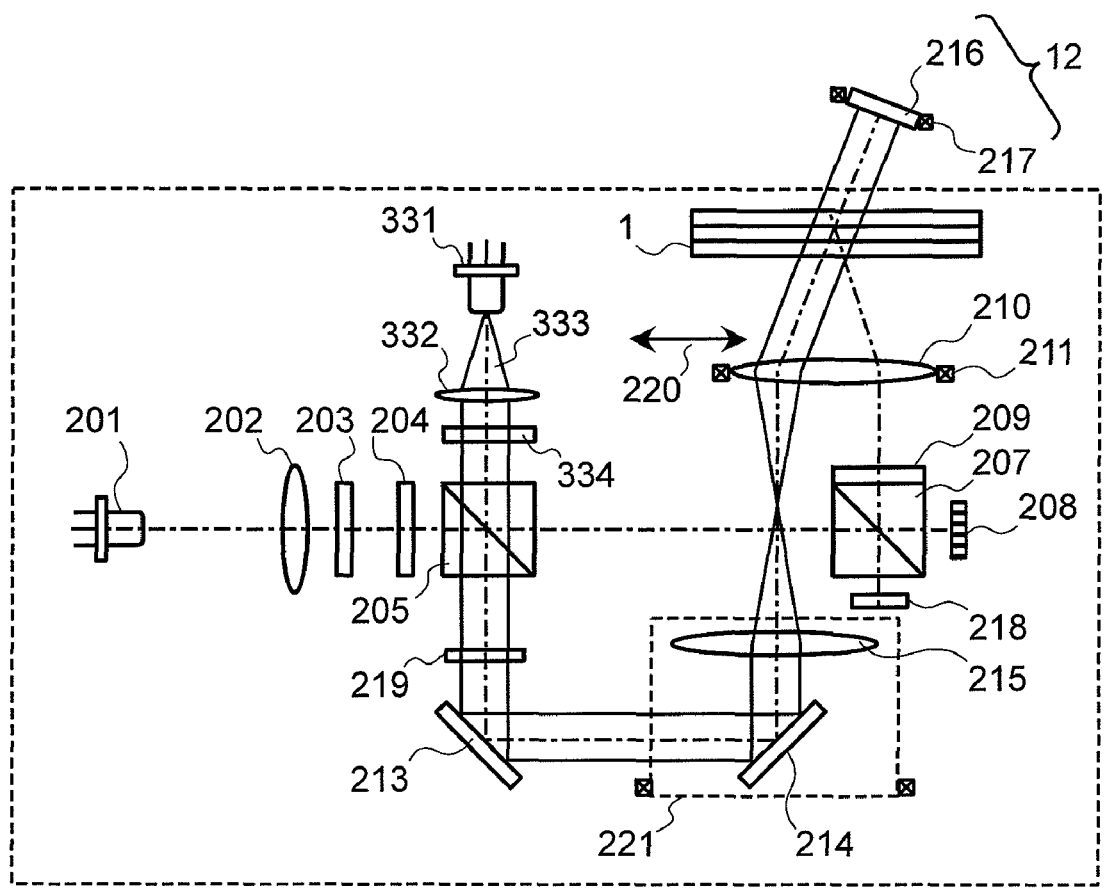
FIG. 5 is a schematic diagram illustrating an example of pickup of an optical information recording and reproducing device.

Also, from the viewpoint of coherence mentioned above, the light source for the curing light beam as referred to in FIG. 5 may well be served by the additionally installed laser light source 331 which can emit a light beam of lower coherence than the laser light source 201. As FIG. 5 shows, the curing light beam 333 comes out from the laser light source 331, and is propagated through the collimator lens 332, and the diffuser plate 334, before it is combined with the light path of the reference light beam by the PBS prism 205 and irradiated to the optical information recording medium 1.

By making two laser light sources available, it becomes possible to realize the optical system configuration that can meet what is required of the light beam in regard to coherence while keeping sharing the optical system. Furthermore, the fact that the curing light beam and the reference light beam share most of their light paths is advantageous for downsizing of the device.

In addition, the present invention has the possibility of developing the optical system configuration shown in FIG. 5 and enabling recording and reproducing information on the optical disks such as BDs and HD-DVDs. Explanation is given below referring to FIG. 6.

In case of recording or reproducing information on the basis of holography, as explained in the present example and in reference to FIG. 5, the light beam outputted from the laser light source 201 which emits a high-coherent light beam is to be used as the signal light beam and the reference light beam, and the light beam outputted from the laser light source 331 which emits a light beam of lower coherence than the laser light source 201 is to be used as the light beam for curing.

In case of recording or reproducing information on the optical disk 101 such as BDs or HD-DVDs in the present example, the light beam having low coherence, that is, the light beam outputted from the laser light source 331, is used to suppress laser noise. In other words, the present invention is characterized in that the light source is shared for generating the light beam for curing as well as for generating the light beam for recording and reproducing on BDs and HD-DVDs.

Whether the light beam outputted from the laser light source 331 is to be irradiated to the optical information recording medium 1 as the curing light beam or to be irradiated to the optical disk 101 as the light beam for recording or reproducing on BDs or HD-DVDs can be selected by controlling the light volume for irradiation by properly combining the polarization direction transformation unit 403 with the PBS prism 404. The function of the polarization direction transformation unit 403 can be attained by means of the liquid crystal element or the wavelength plate to be inserted or withdrawn.

For example, in case information is recorded or reproduced on the optical disk 101 such as BDs or HD-DVDs, polarization direction is to be controlled so that the light beam outputted from the polarization direction transformation unit 403 may become S-polarized light. Thereby, the light beam incident on the PBS prism 404 can be reflected and guided to the light path of the beam expander 405.

The light beam transmitted through the beam expander 405 proceeds via the starting mirror 406 and the ¼ wavelength plate 407, before being incident on the objective lens 408 in a state of circularly polarized light and being collected on the information recording plane of the optical disk 101. The light beam reflected on the optical disk 101 takes the light path it has come reversely, and is transmitted via the objective lens 408, the ¼ wavelength plate 407, the starting mirror 406, and the beam expander 405, and further through the beam splitter 404. The light beam after transmitted through the beam splitter 404 is further transmitted through the collimator lens 409, and a required light beam is diffraction-split by the detection-side diffraction grating 410 and collected at the photodetector 411 so as to be able to detect required servo signals.

When to apply curing to the optical information recording medium 1, polarization direction is to be controlled so that the light beam outputted from the polarization direction transformation unit 403 may become P-polarized light. Thereby, the light beam incident on the PBS prism 404 can be transmitted through and guided to the light path of the reference light beam. By guiding the light beam from the laser light source 331 to the optical information recording medium 1 availing of the light path of the reference light beam, it becomes possible to exercise precure and post-cure of the optical information recording medium 1.

As described above, the light source is shared for generating the light beam for curing as well as for generating the light beam for recording and reproducing of BDs or HD-DVDs, and at the same time, most of the light path is also shared for the curing light beam and for the reference light beam. Such sharing in the light source and the light path makes it possible to wrap up a plurality of optical system configurations rationally in one cabinet, offering a great advantage in downsizing of the device.

Besides, the same rotary motor may well be used in the present invention for driving the optical information recording medium 1 as well as for driving the optical disk 101 such as BDs or HD-DVDs. Or otherwise, separate rotary motors may well be provided for individual uses and driven by the disk rotating motor control circuit.

Also, the optical information recording medium 1 in the present invention may well take the shape of a card.

In FIG. 1, each configuration has been explained as related to recording and reproduction utilizing holography, but the same configurations are of course adaptable to recording and reproduction of BDs and HD-DVDs.

Figure 6:
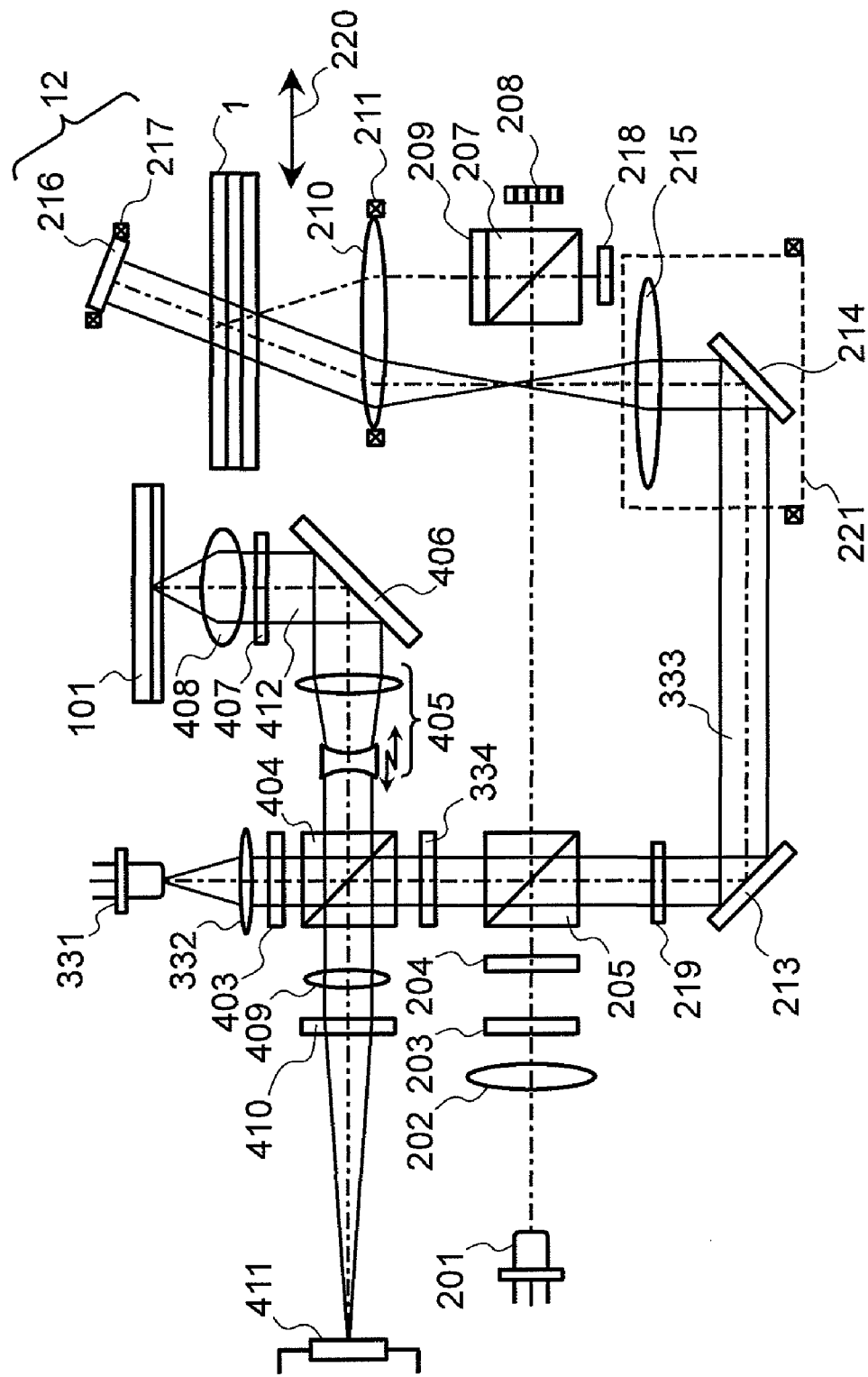
FIG. 6 is a schematic diagram illustrating an example of pickup of an optical information recording and reproducing device.
Figure 8:
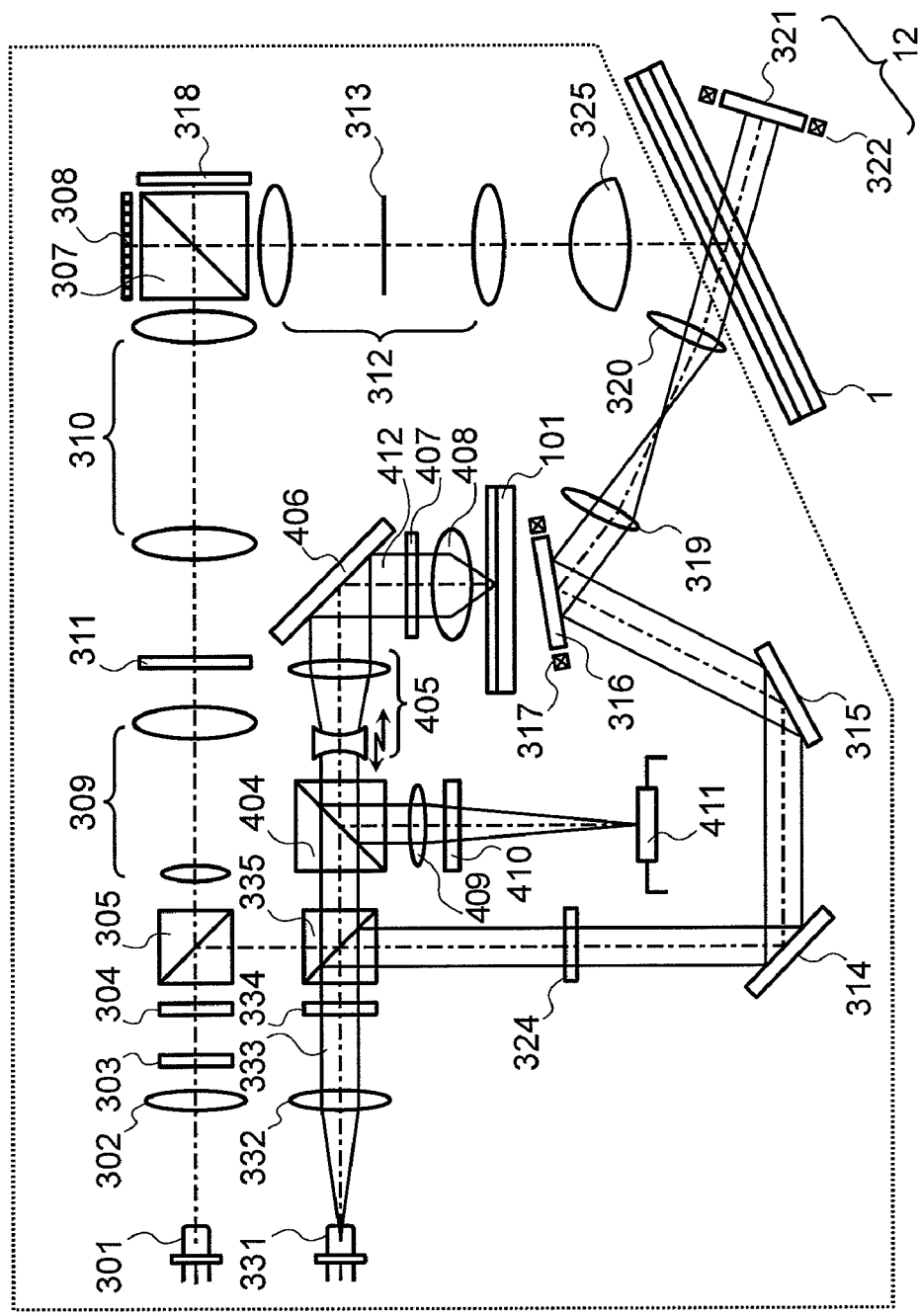
FIG. 8 is a schematic diagram illustrating an example of pickup of an optical information recording and reproducing device.
Figure 9:
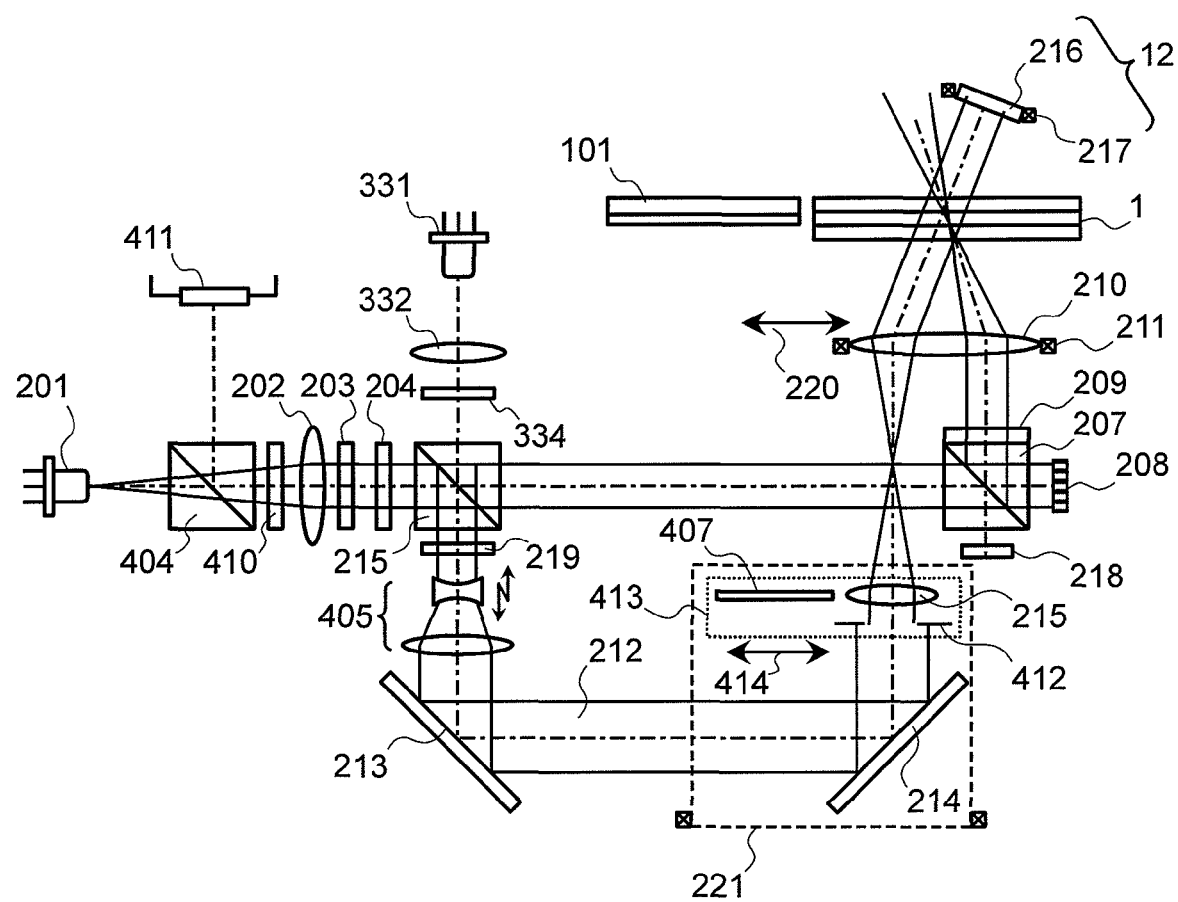
FIG. 9 is a schematic diagram illustrating an example of pickup of an optical information recording and reproducing device.
Figure 10:
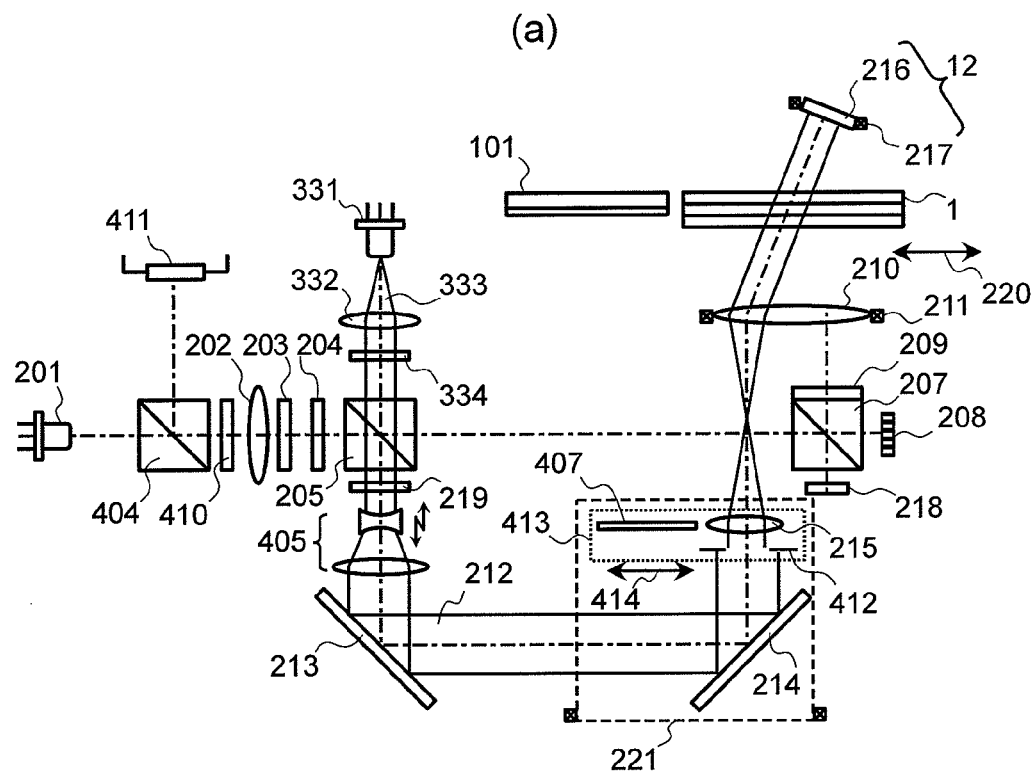
FIG. 10 is a schematic diagram illustrating an example of pickup of an optical information recording and reproducing device.
Figure 10:
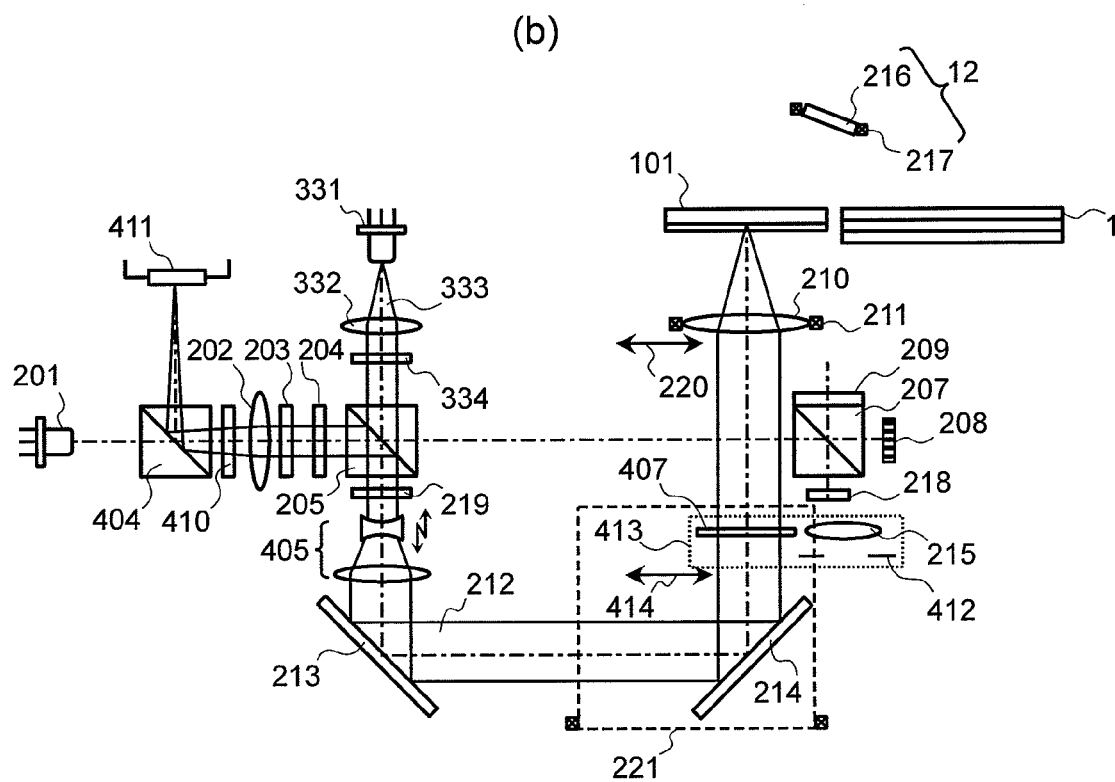

The optical information recording and reproducing device or the optical information reproducing device according to the present invention which device utilizes holography in recording and reproducing signals and also uses BDs, HD-DVDs, and other optical disks as recording or reproducing media is not limited to the optical system configurations shown in FIG. 6 and FIG. 8, but may as well take such optical system configurations as shown in FIG. 9 and FIG. 10, for example. Detailed explanation is omitted here about the optical system configuration as it is based on the FIG. 4 about which explanation was already made, but FIG. 9 illustrates the state that the light beam outputted from the laser light source 201 is split into the signal light beam and the reference light beam by means of the polarization beam splitter 205, with the signals being recorded on the optical information recording medium 1 based on holography. Also, FIG. 10(a) illustrates the state that the optical information recording medium 1 is cured by the light beam outputted from the laser light source 331 which emits a light beam of lower coherence that the laser light source 201; FIG. 10(b) likewise indicates the state that recording or reproduction of information is made on the optical disk 101 such as a BD or a HD-DVD.

In the configurations in FIG. 6 and FIG. 8 above-mentioned, the objective lens used to collect light beams on the optical disk 101 in recording or reproducing information on the optical disks such as BDs and HD-DVDs has been the objective lens 408 which is different from the objective lens 210 used for recording or reproducing signals based on holography. On the other hand, the examples shown in FIG. 9 and FIG. 10 are characterized in that the objective lens 210 used for recording or reproducing of signals based on holography is also used for collecting the light beams on BDs, HD-DVDs, and other optical disks 101.

To realize the above feature, the present example provides the holder 413 having the aperture 412 and the lens 215 and also provides a mechanism which enables displacement of the position of the holder 413 along the movable direction 414. By adoption of such mechanism, change-over is possible for the light beam either to go through the lens 215 or not to go through the lens 215 when the light beam reflected at the mirror 214 is transmitted through the holder 414. In other words, when the light beam reflected at the mirror 214 is incident on the objective lens 210, selection is available for the light beam either to be transmitted through the lens 215 and made to focus once on the back focus plane of the objective lens 210 as shown in FIG. 10(a), or to be made incident on the objective lens 210 directly without going via the lens 215 as shown in FIG. 10(b). Additionally in the present example, the objective lens 210 has a mechanism by which the position of the lens 210 is made adjustable along the movable direction 220. Therefore, the objective lens 210 is adjustable in its position so that the light beam incident on the entrance pupil of the objective lens 210 may be incident fittingly on a desired position.

The present example also provides the beam expander 405 so that the light beam 212 proceeding to the mirror 214 after reflected at the polarization beam splitter 205 may be given a desired diameter of luminous flux. More specifically, the beam expander 405 is so designed that the luminous flux of the light beam incident on the objective lens 210 may have a diameter equivalent to a numerical aperture of 0.85 when the system is in charge of recording or reproduction of BDs. Since displacing the position of the lens in the beam expander 405 enables adjustment in convergence, divergence, and parallelism, it is made also possible to adjust correction amount of spherical aberration.

Figure 7:
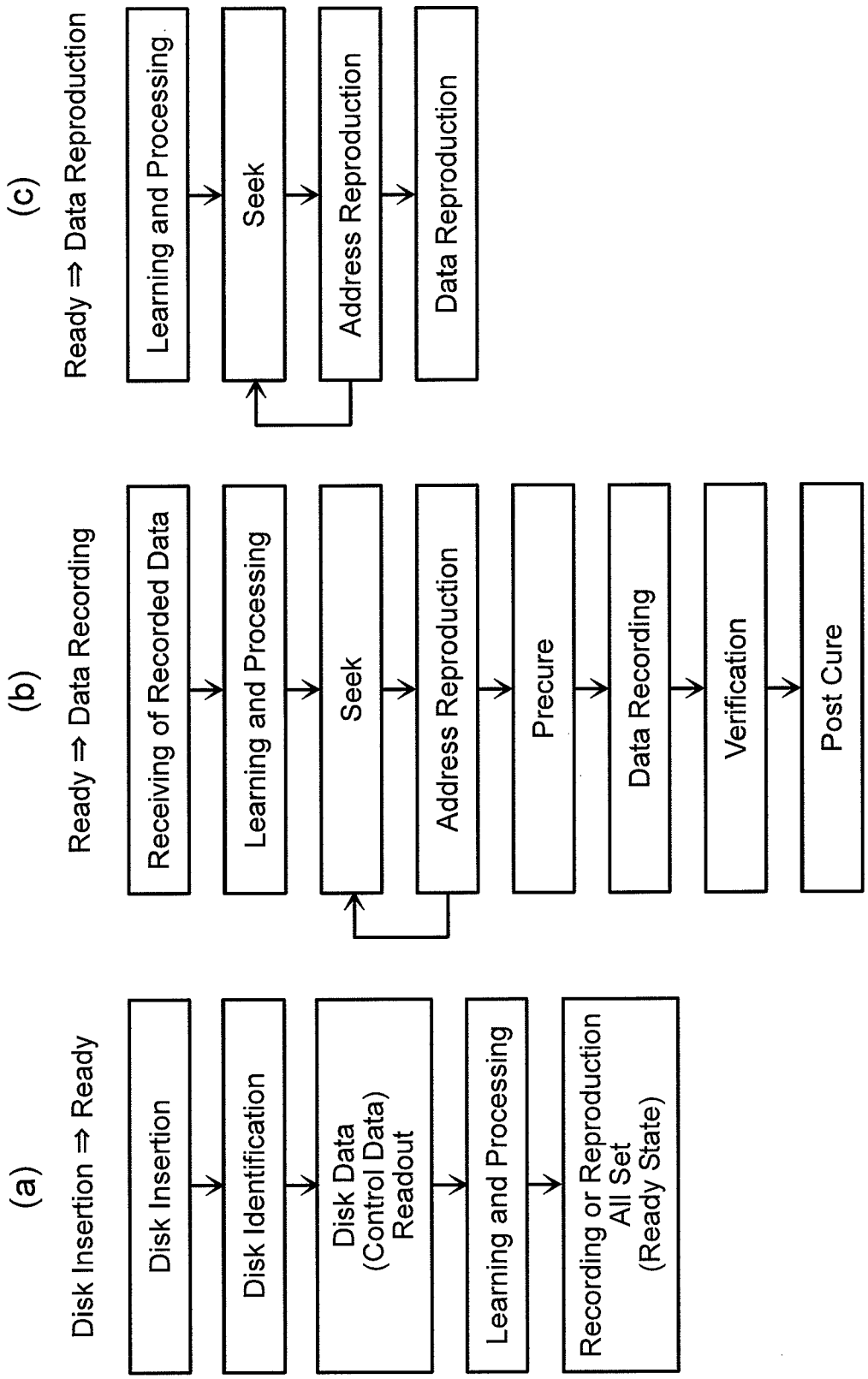
FIG. 7 is a block diagram showing an example of operational flow of an optical information recording and reproducing device.

And in FIG. 7, shown is the operational flow of recording and reproduction in the optical information recording and reproducing device 10. Explanation is made in particular about the flow of recording and reproduction utilizing holography.

FIG. 7(a) indicates the operational flow starting from immediately after the optical information recording medium 1 is inserted in the optical information recording and reproducing device 10 till the preparation for recording and reproduction is finished. FIG. 7(b) covers the operational flow from the state of the preparation finished till recording of information done on the optical information recording medium 1. And, FIG. 7(c) shows the operational flow from the state of the preparation finished till reproduction of information recorded in the optical information recording medium 1.

As shown in FIG. 7(a), when a recording medium is inserted, the optical information recording and reproducing device 10 conducts disk identification to find out, for example, whether or not the inserted disk is the medium on which digital information is recorded or reproduced by utilization of holography.

If the disk is identified, as a result of disk identification, to be an optical information recording medium used to record or reproduce digital information by utilizing holography, the optical information recording and reproducing device 10 is to read out the control data contained in the optical information recording medium to acquire, for example, the information on the optical information recording medium and various set-up conditions applicable to recording or reproducing operation.

After readout of the control data, various adjustments corresponding to the control data and the learning and processing relating to the pickup 11 are undertaken inducing the optical information recording and reproducing device 10 into a ready mode for recording and reproduction.

The operational flow from the ready mode till data recording is as shown in FIG. 7(b). In the first place, the data to be is received, and the information according to that data is to be supplied to the spatial light modulator in the pickup 11.

Then, in order that high quality information can be recorded, various matters of learning are processed in advance according to need; and while seek operations and address reproductions are being repeated, the pickup 11 and the disk cure optical system 13 are to be arranged in certain proper positions in relation to the optical information recording medium.

Following the above, required ambits are to be precured with the light beam outputted from the disk cure optical system 13, and recording of the data is made by using the reference light beam and the signal light beam emitted from the pickup 11.

After recording of the data, such data maybe verified as needed, and post-curing is conducted with the light beam outputted from the disk cure optical system 13.

FIG. 7(c) shows the operational flow from the ready mode till reproduction of the recorded data. In order to realize reproduction of high-quality information from the optical information recording medium, various matters of learning are processed in advance according to need; and while seek operations and address reproductions are being repeated, the pickup 11 and the phase conjugate optical system 12 are to be arranged in certain proper positions in relation to the optical information recording medium.

Subsequently, the reference light beam is emitted from the pickup 11 to read out the information recorded in the optical information recording medium.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical information recording and reproducing device, configured to record a first digital information onto a holographic storage medium, by using a signal beam and a reference beam, and to record a second digital information onto a Blu-ray disc, the optical information recording and reproducing device comprising:
   a first laser light source configured to generate a first light beam to cure the holographic storage medium, and to record the second digital information onto the Blu-ray disc;
   a second laser light source configured to generate a second light beam to record the first digital information onto the holographic storage medium;
   a first beam splitter configured to transmit or reflect the first light beam from the first laser light source, and to generate a third light beam and a fourth light beam, the third light beam configured to cure the holographic storage medium, and the fourth light beam configured to record information onto the Blue-ray disc; and
   a second beam splitter configured to split the second light beam from the second laser light source into a signal beam and a reference beam;
   wherein the third light beam and the reference beam travel along a same optical path, at least from the first beam splitter or the second beam splitter to the holographic storage medium, and the third light beam and the reference beam are irradiated to the holographic storage medium in a state of parallel beam.

2. The optical information recording and reproducing device according to claim 1, wherein the first laser light source emits the first light beam of lower coherence as compared with the second light beam.

3. A method of recording and reproducing a first digital information onto a holographic storage medium, by using a signal beam and a reference beam, and of recording a second digital information onto a Blu-ray disc, the method comprising the steps of:
   transmitting or reflecting a first light beam, by using a first beam splitter;
   generating a third light beam and a fourth light beam from the first beam splitter, the third light beam configured to cure the holographic storage medium, and the fourth light beam configured to record the second digital information onto the Blue-ray disc;
   curing the holographic storage medium, by using the third light beam;
   recording the second digital information onto the Blu-ray disc, by using the fourth light beam;
   splitting a second light beam into a signal beam and a reference beam, by using a second beam splitter;
   recording the first digital information onto the holographic storage medium, by using the signal beam and the reference beam; and
   wherein the first light beam and the reference beam travel along a same optical path, at least from the first beam splitter or the second beam splitter to the holographic storage medium, and the third light beam and the reference beam are irradiated to the holographic storage medium in a state of parallel beam.

4. The method according to claim 3, wherein the first light beam has a lower coherence than the second light beam.

5. An optical information recording and reproducing device, configured to record a first digital information onto a holographic storage medium, by using a signal beam and a reference beam, and to record a second digital information onto a non-holographic disc, the optical information recording and reproducing device comprising;
   a first laser light source configured to generate a first light beam to cure the holographic storage medium, and to record the second digital information onto the non-holographic disc;
   a second laser light source configured to generate a second light beam to record the first digital information onto the holographic storage medium;
   a first beam splitter configured to transmit or reflect the first light beam from the first laser light source, and to generate a third light beam and a fourth light beam, the third light beam configured to cure the holographic storage medium, and the fourth light beam configured to record information onto the non-holographic disc; and a second beam splitter configured to split the second light beam from the second laser light source into a signal beam and a reference beam;

wherein the third light beam and the reference beam travel along a same optical path, at least from the first beam splitter or the second beam splitter to the holographic storage medium, and the third light beam and the reference beam are irradiated to the holographic storage medium in a state of parallel beam.

6. The optical information recording and reproducing device according to claim 5, wherein the first laser light source emits the first light beam of lower coherence as compared with the second light beam.

7. A method of recording and reproducing a first digital information onto a holographic storage medium, by using a signal beam and a reference beam, and of recording a second digital information onto a non-holographic disc, the method comprising the steps of:

transmitting or reflecting a first light beam, by using a first beam splitter;

generating a third light beam and a fourth light beam from the first beam splitter, the third light beam configured to cure the holographic storage medium, and the fourth light beam configured to record the second digital information onto the non-holographic disc;

curing the holographic storage medium, by using the third light beam;

recording the second digital information onto the non-holographic disc, by using the fourth light beam;

splitting a second light beam into a signal beam and a reference beam, by using a second beam splitter;

recording the first digital information onto the holographic storage medium, by using the signal beam and the reference beam; and wherein the first light beam and the reference beam travel along a same optical path, at least from the first beam splitter or the second beam splitter to the holographic storage medium, and the third light beam and the reference beam are irradiated to the holographic storage medium in a state of parallel beam.

8. The method according to claim 7, wherein the first light beam has a lower coherence than the second light beam.

\* \* \* \* \*